(12) United States Patent
Hammond

(10) Patent No.: US 7,800,254 B2
(45) Date of Patent: Sep. 21, 2010

(54) SYSTEM FOR BYPASSING A POWER CELL OF A POWER SUPPLY

(75) Inventor: Peter Willard Hammond, Greensburg, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 387 days.

(21) Appl. No.: 11/857,646

(22) Filed: Sep. 19, 2007

(65) Prior Publication Data

US 2008/0079314 A1 Apr. 3, 2008

Related U.S. Application Data

(60) Provisional application No. 60/848,153, filed on Sep. 28, 2006.

(51) Int. Cl.
*H01H 9/54* (2006.01)

(52) U.S. Cl. .................. 307/140; 307/412

(58) Field of Classification Search .......... 307/412, 307/140
See application file for complete search history.

(56) References Cited

U.S. PATENT DOCUMENTS

| 5,625,545 A | 4/1997 | Hammond |
| 5,986,909 A | 11/1999 | Hammond et al. |
| 6,222,284 B1 | 4/2001 | Hammond et al. |
| 7,088,073 B2 * | 8/2006 | Morishita .................. 318/801 |

\* cited by examiner

*Primary Examiner*—Robert L. DeBeradinis
(74) *Attorney, Agent, or Firm*—Filip A. Kowalewski

(57) ABSTRACT

A system. The system includes a multi-winding device having a primary winding and a plurality of three-phase secondary windings, and a plurality of power cells. Each power cell is connected to a different three-phase secondary winding of the multi-winding device. The system also includes a first contact connected to a first input terminal of at least one of the power cells, a second contact connected to a second input terminal of the at least one of the power cells, and a third contact connected to first and second output terminals of the at least one of the power cells.

20 Claims, 19 Drawing Sheets

SYSTEM FOR BYPASSING A POWER CELL OF A POWER SUPPLY

CROSS REFERENCE TO RELATED APPLICATION

This application claims the priority benefit of U.S. Provisional Patent Application No. 60/848,153, filed on Sep. 28, 2006.

NOT APPLICABLE

BACKGROUND

This application discloses an invention that is related, generally and in various embodiments, to a system for bypassing a power cell in a multi-cell power supply.

In certain applications, multi-cell power supplies utilize modular power cells to process power between a source and a load. Such modular power cells can be applied to a given power supply with various degrees of redundancy to improve the availability of the power supply. For example, FIG. 1 illustrates various embodiments of a power supply (e.g., an AC motor drive) having nine such power cells. The power cells in FIG. 1 are represented by a block having input terminals A, B, and C; and output terminals T1 and T2. In FIG. 1, a transformer or other multi-winding device 110 receives three-phase, medium-voltage power at its primary winding 112, and delivers power to a load 130 such as a three-phase AC motor via an array of single-phase inverters (also referred to as power cells). Each phase of the power supply output is fed by a group of series-connected power cells, called herein a "phase-group".

The transformer 110 includes primary windings 112 that excite a number of secondary windings 114-122. Although primary winding 112 is illustrated as having a star configuration, a mesh configuration is also possible. Further, although secondary windings 114-122 are illustrated as having a delta or an extended-delta configuration, other configurations of windings may be used as described in U.S. Pat. No. 5,625,545 to Hammond, the disclosure of which is incorporated herein by reference in its entirety. In the example of FIG. 1 there is a separate secondary winding for each power cell. However, the number of power cells and/or secondary windings illustrated in FIG. 1 is merely exemplary, and other numbers are possible. Additional details about such a power supply are disclosed in U.S. Pat. No. 5,625,545.

Any number of ranks of power cells are connected between the transformer 110 and the load 130. A "rank" in the context of FIG. 1 is considered to be a three-phase set, or a group of three power cells established across each of the three phases of the power delivery system. Referring to FIG. 1, rank 150 includes power cells 151-153, rank 160 includes power cells 161-163, and rank 170 includes power cells 171-173. A master control system 195 sends command signals to local controls in each cell over fiber optics or another wired or wireless communications medium 190. It should be noted that the number of cells per phase depicted in FIG. 1 is exemplary, and more than or less than three ranks may be possible in various embodiments.

FIG. 2 illustrates various embodiments of a power cell 210 which is representative of various embodiments of the power cells of FIG. 1. The power cell 210 includes a three-phase diode-bridge rectifier 212, one or more direct current (DC) capacitors 214, and an H-bridge inverter 216. The rectifier 212 converts the alternating current (AC) voltage received at cell input 218 (i.e., at input terminals A, B and C) to a substantially constant DC voltage that is supported by each capacitor 214 that is connected across the output of the rectifier 212. The output stage of the power cell 210 includes an H-bridge inverter 216 which includes two poles, a left pole and a right pole, each with two switching devices. The inverter 216 transforms the DC voltage across the DC capacitors 214 to an AC output at the cell output 220 (i.e., across output terminals T1 and T2) using pulse-width modulation (PWM) of the semiconductor devices in the H-bridge inverter 216.

As shown in FIG. 2, the power cell 210 may also include fuses 222 connected between the cell input 218 and the rectifier 212. The fuses 222 may operate to help protect the power cell 210 in the event of a short-circuit failure. According to other embodiments, the power cell 210 is identical to or similar to those described in U.S. Pat. No. 5,986,909 and its derivative U.S. Pat. No. 6,222,284 to Hammond and Aiello, the disclosures of which are incorporated herein by reference in their entirety.

FIG. 3 illustrates various embodiments of a bypass device 230 connected to output terminals T1 and T2 of the power cell 210 of FIG. 2. In general, when a given power cell of a multi-cell power supply fails in an open-circuit mode, the current through all the power cells in that phase-group will go to zero, and further operation is not possible. A power cell failure may be detected by comparing a cell output voltage to the commanded output, by checking or verifying cell components, through the use of diagnostics routines, etc. In the event that a given power cell should fail, it is possible to bypass the failed power cell and continue to operate the multi-cell power supply at reduced capacity.

The bypass device 230 is a single pole single throw (SPST) contactor, and includes a contact 232 and a coil 234. As used herein, the term "contact" generally refers to a set of contacts having stationary portions and a movable portion. Accordingly, the contact 232 includes stationary portions and a movable portion which is controlled by the coil 234. The bypass device 230 may be installed as an integral part of a converter subassembly in a drive unit. In other applications the bypass device 230 may be separately mounted. When the movable portion of the contact 232 is in a bypass position, a shunt path is created between the respective output lines connected to output terminals T1 and T2 of the power cell 210. Stated differently, when the movable portion of the contact 232 is in a bypass position, the output of the failed power cell is shorted. Thus, when power cell 210 experiences a failure, current from other power cells in the phase group can be carried through the bypass device 230 connected to the failed power cell 210 instead of through the failed power cell 210 itself.

FIG. 4 illustrates various embodiments of a different bypass device 240 connected output terminals T1 and T2 of the power cell 210. The bypass device 240 is a single pole double throw (SPDT) contactor, and includes a contact 242 and a coil 244. The contact 242 includes stationary portions and a movable portion which is controlled by the coil 244. When the movable portion of the contact 242 is in a bypass position, one of the output lines of the power cell 210 is disconnected (e.g., the output line connected to output terminal T2 in FIG. 4) and a shunt path is created between the output line connected to output terminal T1 of the power cell 210 and a downstream portion of the output line connected to output terminal T2 of the power cell 210. The shunt path carries current from other power cells in the phase group which would otherwise pass through the power cell 210. Thus, when power cell 210 experiences a failure, the output of the failed power cell is not shorted as is the case with the bypass configuration of FIG. 3.

The bypass devices shown in FIGS. 3 and 4 do not operate to disconnect power to any of the input terminals A, B or C in the event of a power cell failure. Thus, in certain situations, if the failure of a given power cell is not severe enough to cause the fuses 222 (see FIG. 2) to disconnect power to any two of input terminals A, B or C, the failure can continue to cause damage to the given power cell.

SUMMARY

In one general respect, this application discloses a system for bypassing a power cell in a multi-cell power supply. According to various embodiments, the system includes a multi-winding device having a primary winding and a plurality of three-phase secondary windings, and a plurality of power cells. Each power cell is connected to a different three-phase secondary winding of the multi-winding device. The system also includes a first contact connected to a first input terminal of at least one of the power cells, a second contact connected to a second input terminal of the at least one of the power cells, and a third contact connected to first and second output terminals of the at least one of the power cells.

According to other embodiments, the system includes a multi-winding device having a primary winding and a plurality of three-phase secondary windings, and a plurality of power cells. Each power cell is connected to a different three-phase secondary winding of the multi-winding device. The system also includes a first contactor connected to a first input terminal of at least one of the power cells, a second contactor connected to a second input terminal of the at least one of the power cells, and a third contactor connected to first and second output terminals of the at least one of the power cells.

DESCRIPTION OF THE DRAWINGS

Various embodiments of the invention are described herein by way of example in conjunction with the following figures.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 5:
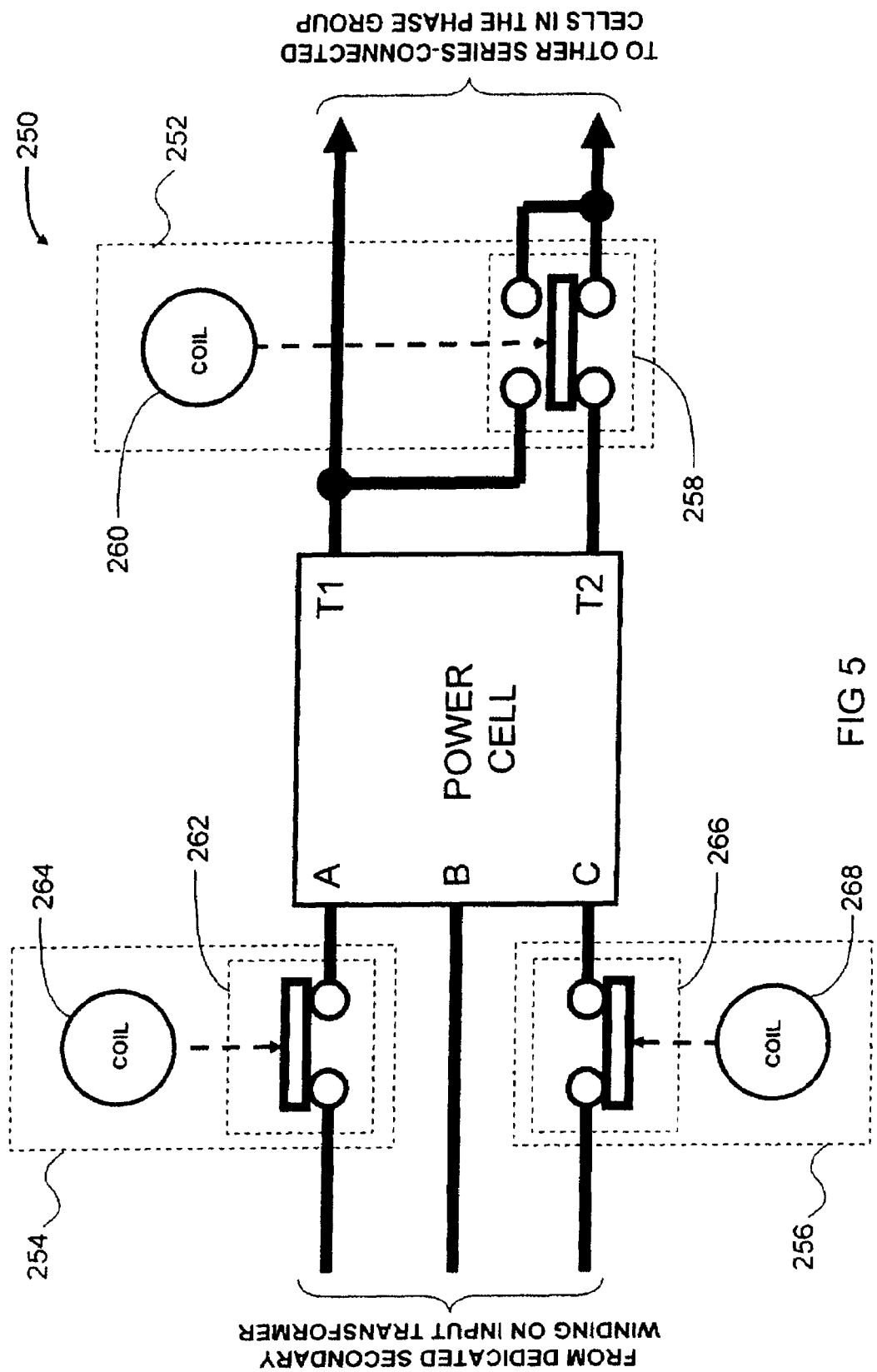
FIG. 5 illustrates various embodiments of a system for bypassing a power cell of a power supply.

FIG. 5 illustrates various embodiments of a system 250 for bypassing a power cell (e.g., power cell 210) of a power supply. As shown in FIG. 5, the system 250 includes bypass device 252 connected to the output terminals T1 and T2, a bypass device 254 connected to input terminal A, and a bypass device 256 connected to input terminal C. Although the system 250 is shown in FIG. 5 as having respective bypass devices connected to input terminals A and C, it will be appreciated that, according to other embodiments, the respective bypass devices may be connected to any two of the input terminals A, B and C.

The bypass devices 252, 254, 256 may be mechanically-driven, fluid-driven, electrically-driven, or solid state, as is described in the '909 and '284 patents. For purposes of simplicity, each bypass device will be described hereinafter in the context of a bypass device which includes one or more electrically-driven contactors which are connected to the output of a power cell. As described hereinafter, a given bypass device may be embodied as a single-pole single-throw (SPST) contactor, a single-pole double-throw (SPDT) contactor, or a multi-pole contactor.

Figure 4:
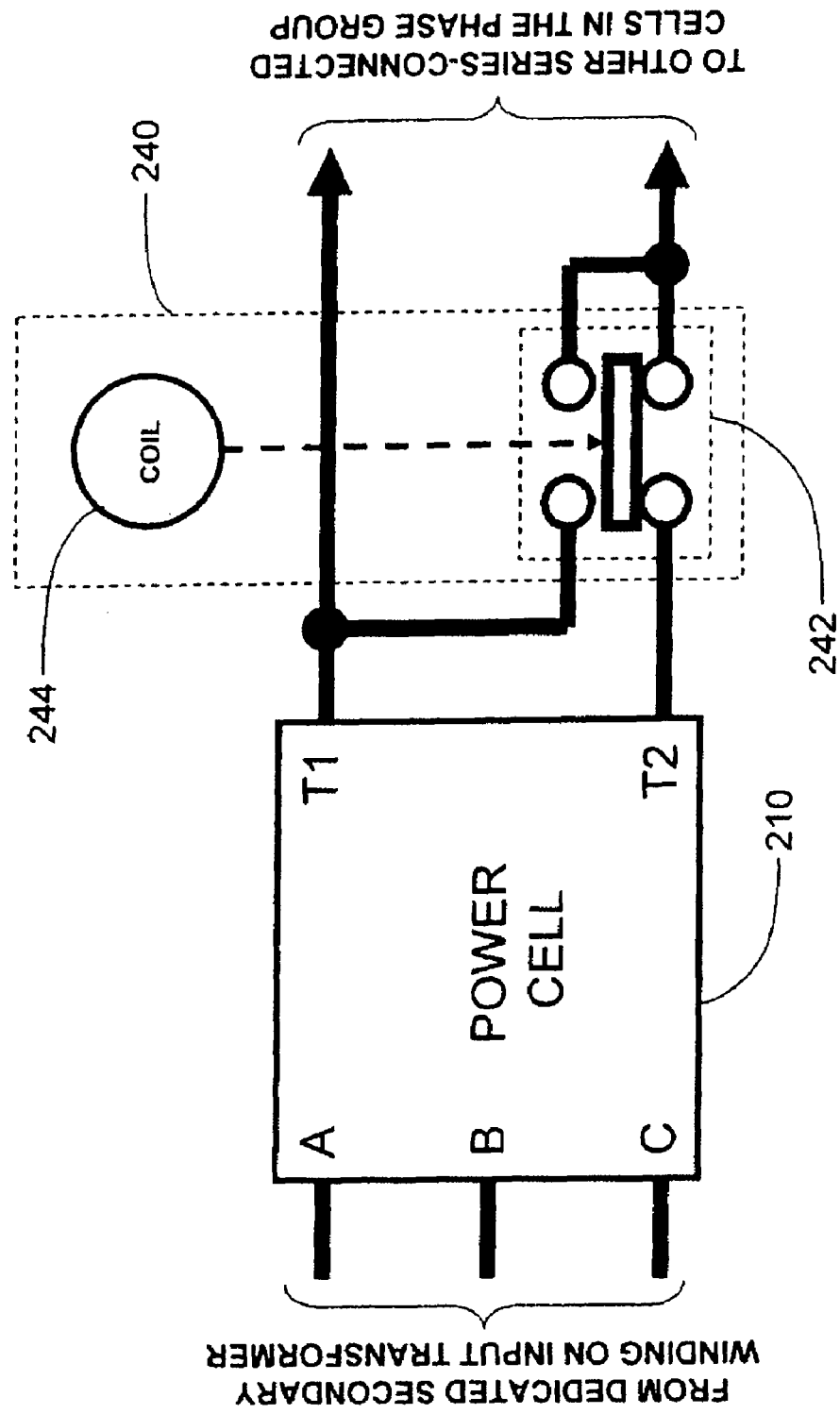
FIG. 4 illustrates various embodiments of a bypass device connected to an output of the power cell of FIG. 2.

Bypass device 252 is a single pole double throw (SPDT) contactor, and includes a contact 258 and a coil 260. The contact 258 includes stationary portions and a movable portion which is controlled by the coil 260. The bypass device 252 operates in a manner similar to that described hereinabove with respect to bypass device 240 of FIG. 4. The bypass device 254 is a single pole single throw (SPST) contactor, and includes a contact 262 and a coil 264. The contact 262 includes stationary portions and a movable portion which is controlled by the coil 264. The bypass device 256 is a single pole single throw (SPST) contactor, and includes a contact 266 and a coil 268. The contact 266 includes stationary portions and a movable portion which is controlled by the coil 268. In general, in the event of a failure, bypass devices 254, 256 disconnect the cell input power at substantially the same time that bypass device 252 creates a shunt path for the current that formerly passed through the failed power cell.

Figure 2:
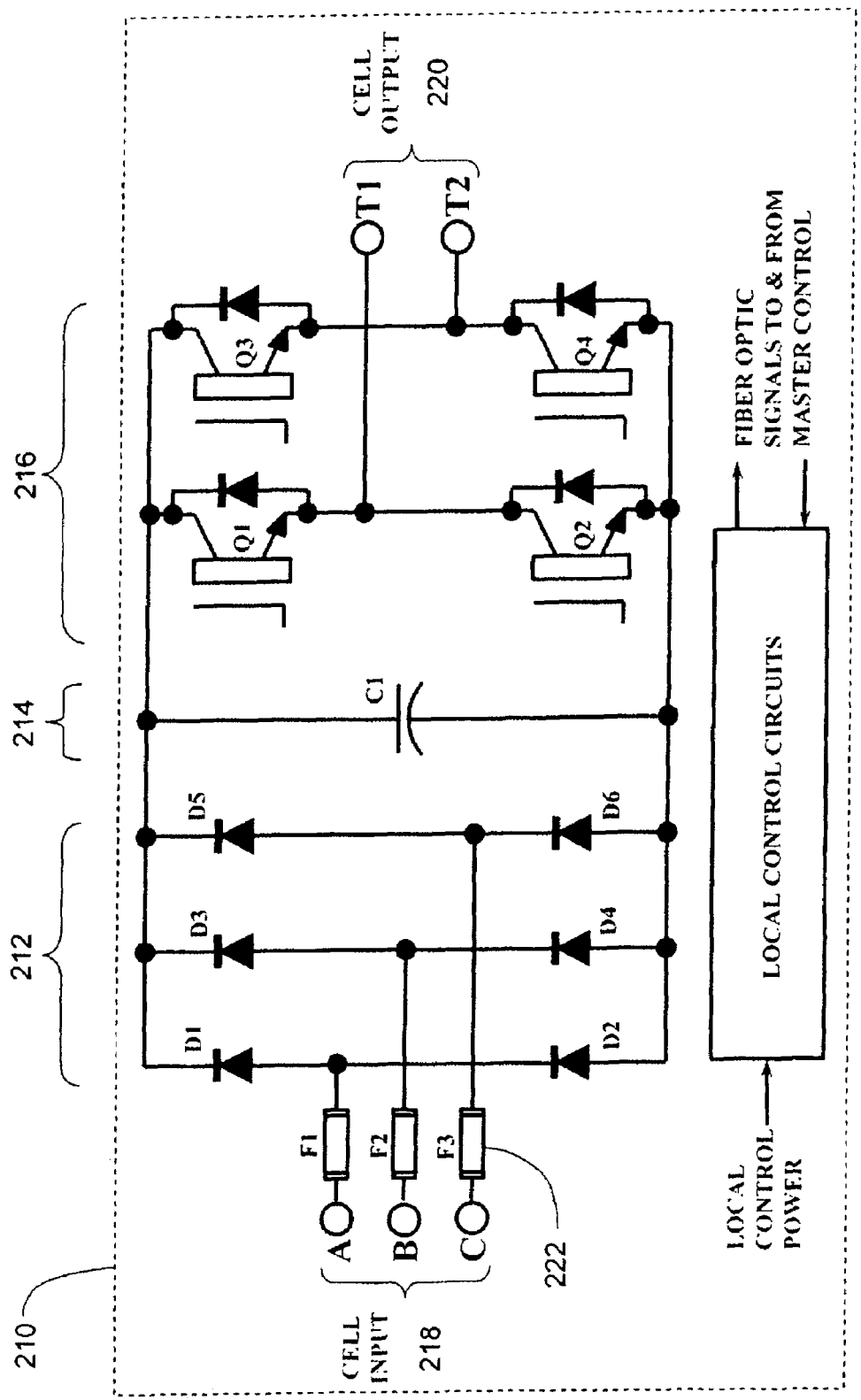
FIG. 2 illustrates various embodiments of a power cell of the power supply of FIG. 1.
Figure 3:
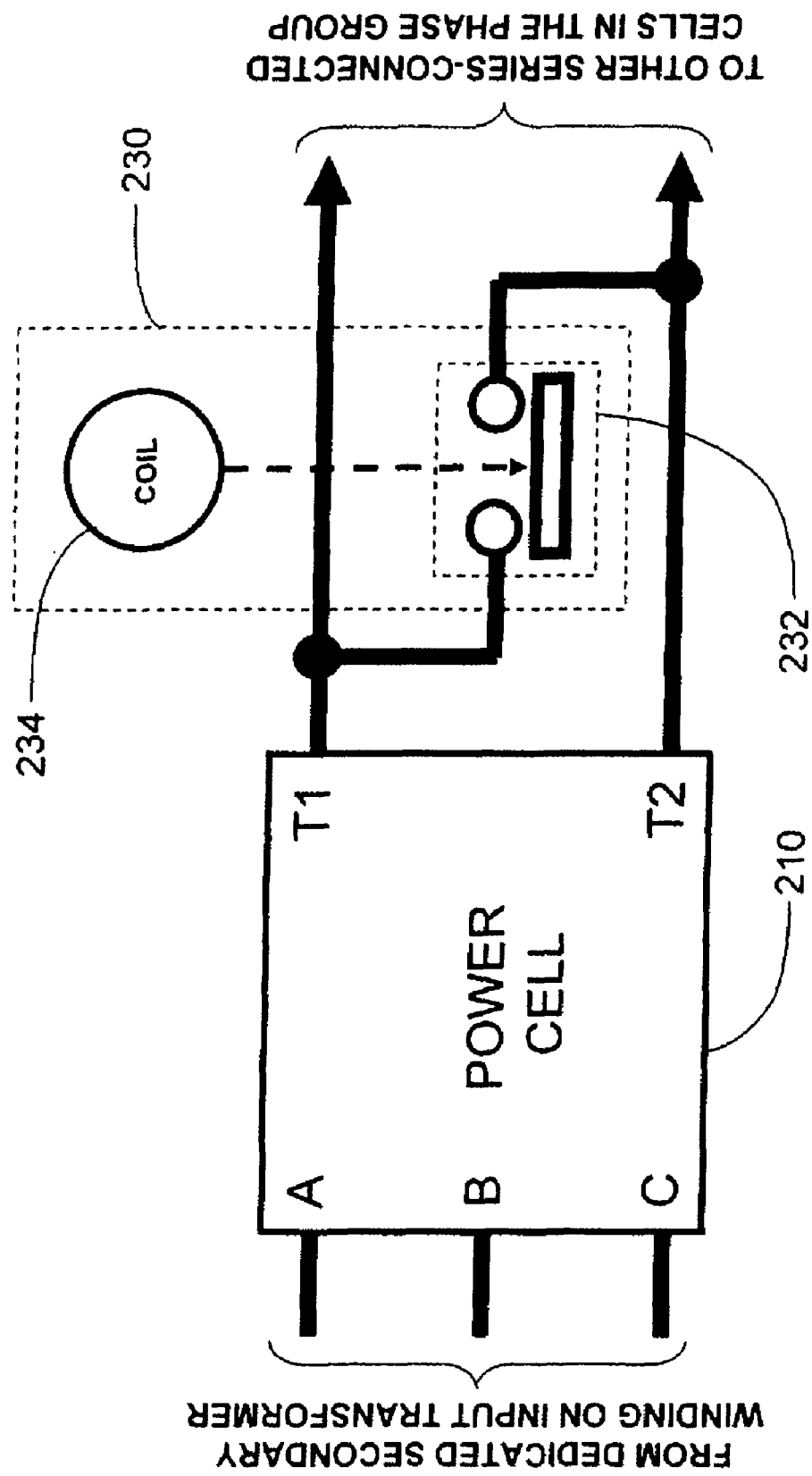
FIG. 3 illustrates various embodiments of a bypass device connected to an output of the power cell of FIG. 2.

The condition associated with the creation of the described shunt path and the disconnection of cell input power from at least two of the cell input terminals may be referred to as "full-bypass". When the full bypass condition is present, no further power can flow into the failed cell. As described with respect to FIG. 2, the fuses 222 of the power cell may operate to help protect the power cell in the event of a short-circuit failure. However, in certain situations (e.g., when fault current is low), the fuses 222 may not clear quickly enough to prevent further damage to the failed power cell. According to various embodiments, the bypass devices 254, 256 are configured to act quicker than the fuses 222, and the quicker action generally results in less damage to the failed power cell.

Figure 6:
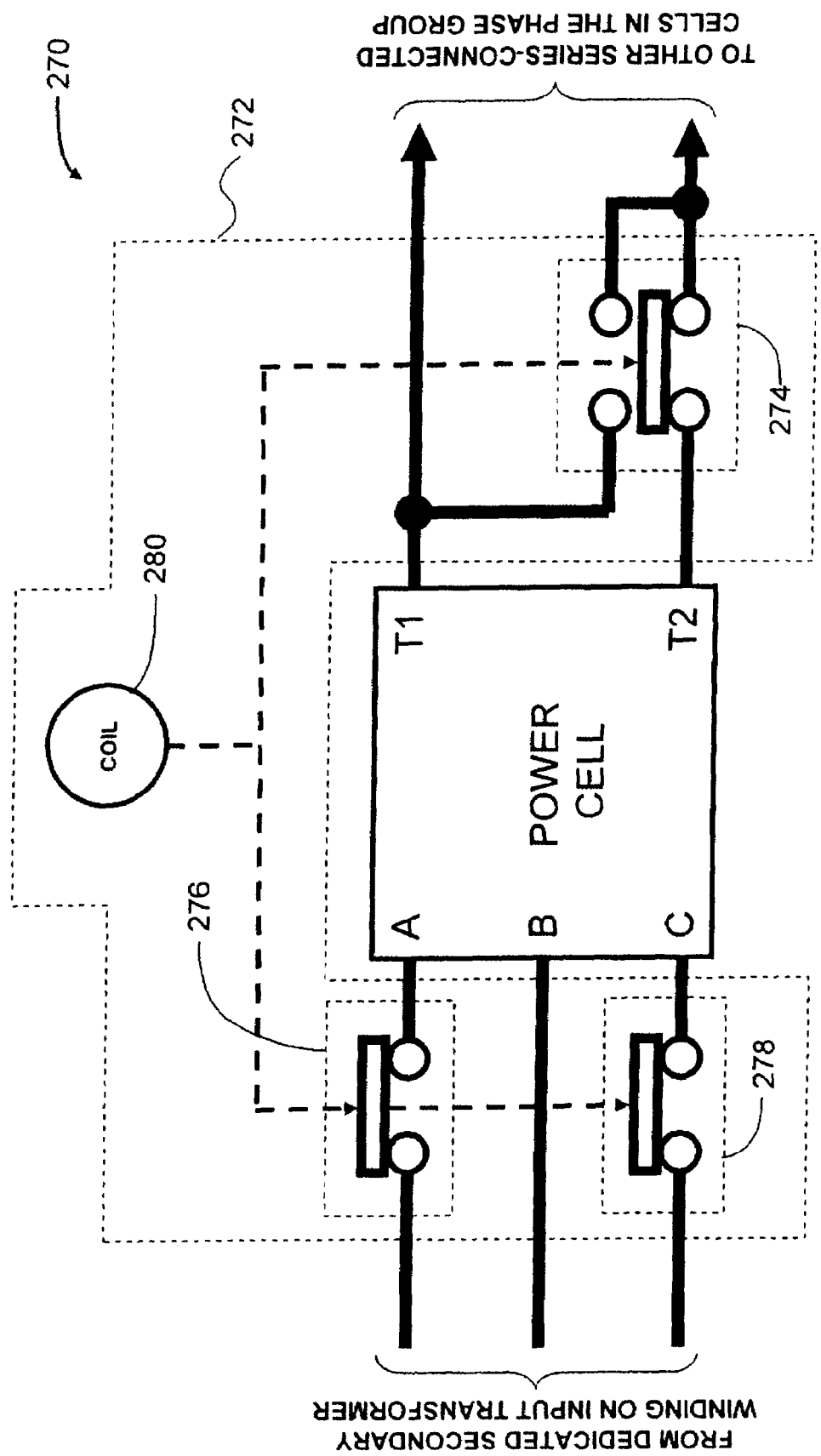
FIG. 6 illustrates various embodiments of a system for bypassing a power cell of a power supply.

FIG. 6 illustrates various embodiments of a system 270 for bypassing a power cell (e.g., power cell 210) of a power supply. The system 270 includes a single bypass device 272 which achieves the combined functionality of the bypass devices 252, 254, 256 of FIG. 5. The bypass device 272 is a multi-pole contactor which includes a first contact 274 connected to the output terminals T1 and T2 of the power cell, a second contact 276 connected to the input terminal A, and a third contact 278 connected to the input terminal C. Each of the contacts 274, 276, 278 include stationary portions and a movable portion. Although the second and third contacts 276, 278 are shown in FIG. 6 as being connected to input terminals A and C, it will be appreciated that, according to other embodiments, the second and third contacts 276, 278 may be connected to any two of the input terminals A, B and C. The bypass device 272 also includes a single coil 280 which controls the movable portions of the contacts 274, 276, 278.

Figure 7:
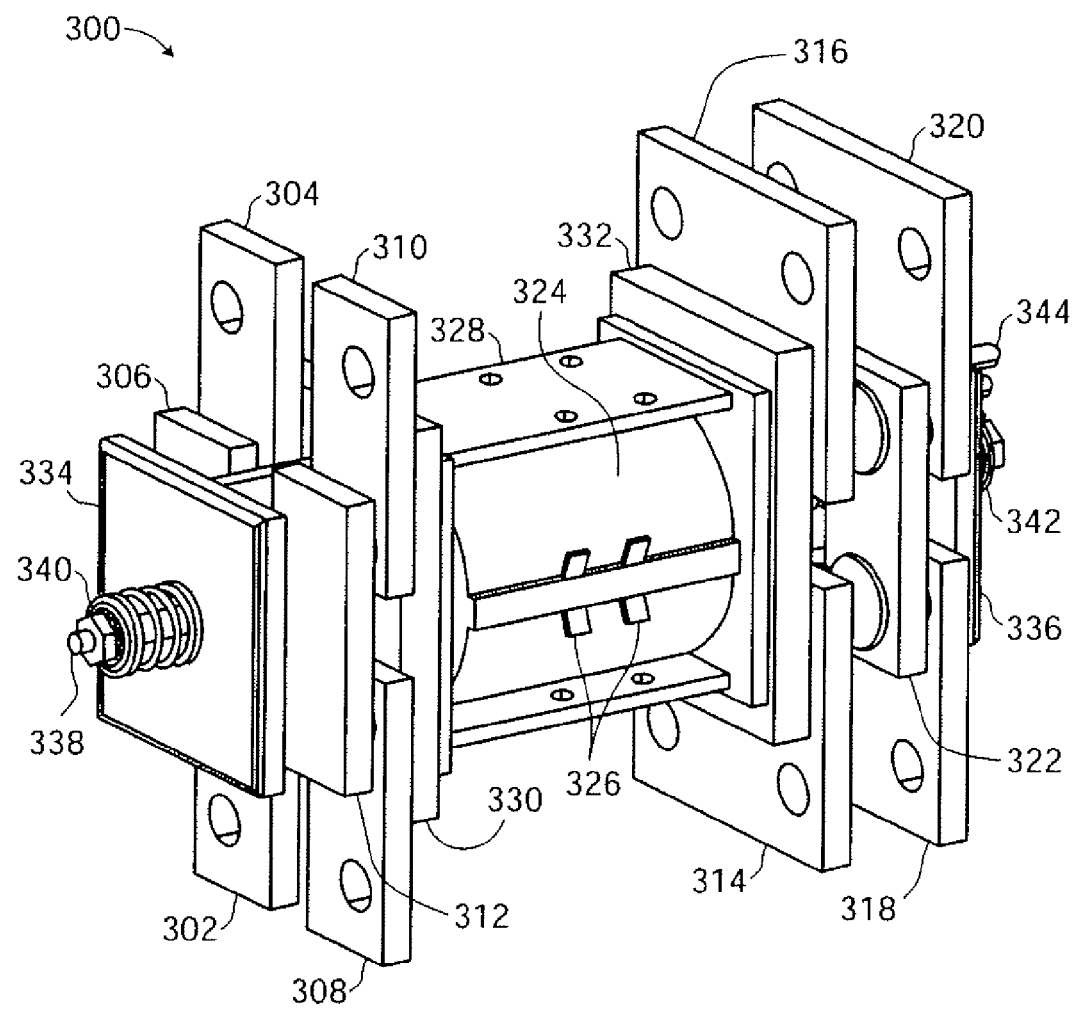
FIGS. 7-9 illustrate various embodiments of a bypass device.
Figure 8:
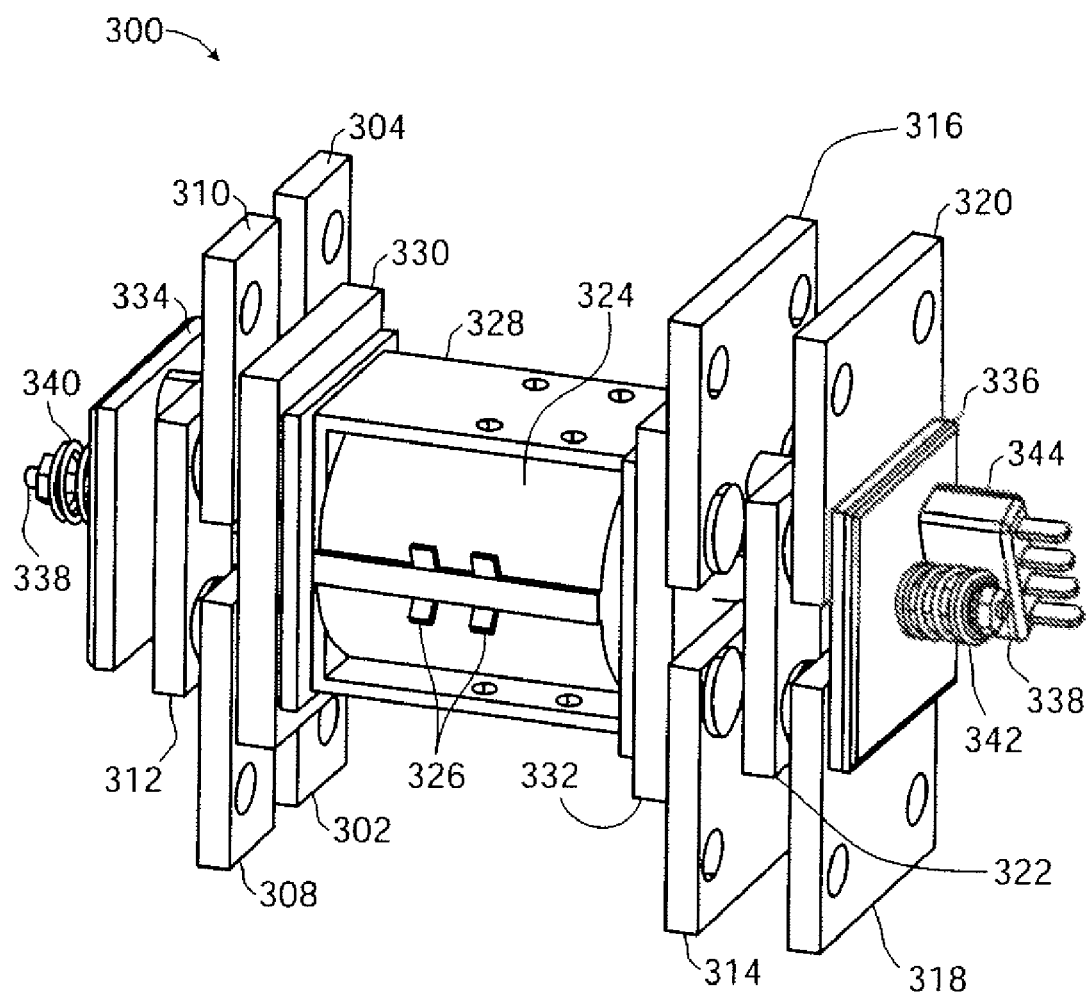
Figure 9:
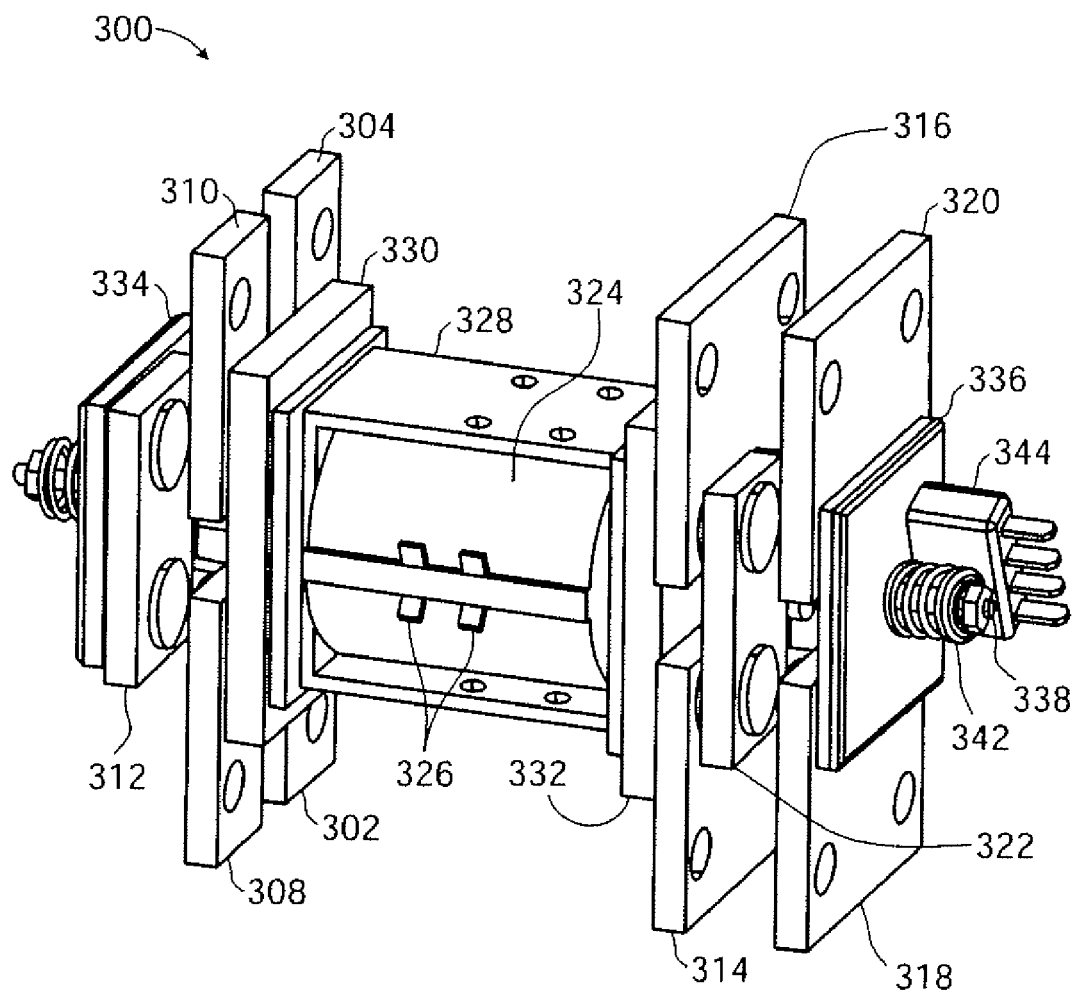

FIGS. 7-9 illustrate various embodiments of a bypass device 300. The bypass device is a multi-pole contactor, and may be identical to or similar to the bypass device 272 of FIG. 6. The bypass device 300 includes a first contact which includes stationary portions 302, 304 and movable portion 306, a second contact which includes stationary portions 308, 310 and a movable portion 312, and a third contact which includes stationary portions 314, 316, 318, 320 and a movable portion 322. The bypass device 300 also includes a coil 324 which controls the movable portions 306, 312, 322 of the first, second and third contacts. The stationary portions 304, 310 of the first and second contacts may be connected to any two of the input terminals A, B and C of a power cell. The stationary portions 314, 318 of the third contact may be respectively connected to the output terminals T1 and T2 of a power cell. The movable portions 306, 312, 322 of the first, second and third contacts are shown in the normal or non-bypass position in FIGS. 7 and 8, and are shown in the bypass position in FIG. 9.

As shown in FIG. 7, the bypass device 300 also includes electrical terminals 326 connected to the coil 324, a steel frame 328 which surrounds the coil 324, a first insulating plate 330 between the steel frame 328 and the stationary portions 304, 308, 310, 312 of the first and second contacts, a second insulating plate 332 between the steel frame 328 and the stationary portions 314, 316 of the third contact, and first and second support brackets 334, 336. The bypass device 300 further includes a non-magnetic shaft 338 which passes through the coil 324, through openings in the steel frame 328, through respective openings in first and second insulating plates 330, 332, and through respective openings of the first and second support brackets 334, 336.

Additionally, the bypass device 300 also includes a first biasing member 340 between the first support bracket 334 and a first end of the non-magnetic shaft 338, a second biasing member 342 between the second support bracket 336 and a second end of the non-magnetic shaft, and a position sensing device 344 which is configured to provide an indication of the position (bypass or non-bypass) of the movable portions 306, 312, 322 of the first, second and third contacts.

Although not shown for purposes of simplicity in FIGS. 7-9, one skilled in the art will appreciate that the bypass device 300 may further include a plunger (e.g., a cylindrical steel plunger) which can travel axially through an opening which extends from the first end of the coil 324 to the second end of the coil 324, permanent magnets capable of holding the movable portions of the contacts in either the bypass or the non-bypass position without current being applied to the coil 324, a first insulating bracket which carries the moving portions 306, 312 of the first and second contacts, a second insulating bracket which carries the moving portion 322 of the third contact, etc.

In operation, permanent magnets (not shown) hold the plunger in either a first or a second position, which in turn holds the movable portions 306, 312, 322 of the contacts in either the non-bypass position or the bypass position. When the electrical terminals 326 receive pulses of current, the pulses of current are applied to the coil 324, thereby generating a magnetic field. Depending on the polarity of the applied pulse and the position of the plunger, the applied pulse may or may not cause the plunger to change its position. For example, according to various embodiments, if the plunger is in the first position and the movable portions 306, 312, 322 of the contacts are in the non-bypass position, a positive current pulse will change the plunger from the first position to the second position, which in turn changes the movable portions 306, 312, 322 of the contacts from the non-bypass position to the bypass position. In contrast, if a negative current pulse is applied, the plunger will stay in the first position and the movable portions 306, 312, 322 of the contacts will stay in the non-bypass position.

Similarly, according to various embodiments, if the plunger is in the second position and the movable portions 306, 312, 322 of the contacts are in the bypass position, a negative current pulse will change the plunger from the second position to the first position, which in turn changes the movable portions 306, 312, 322 of the contacts from the bypass position to the non-bypass position. In contrast, if a positive current pulse is applied, the plunger will stay in the second position and the movable portions 306, 312, 322 of the contacts will stay in the bypass position.

Figure 10:
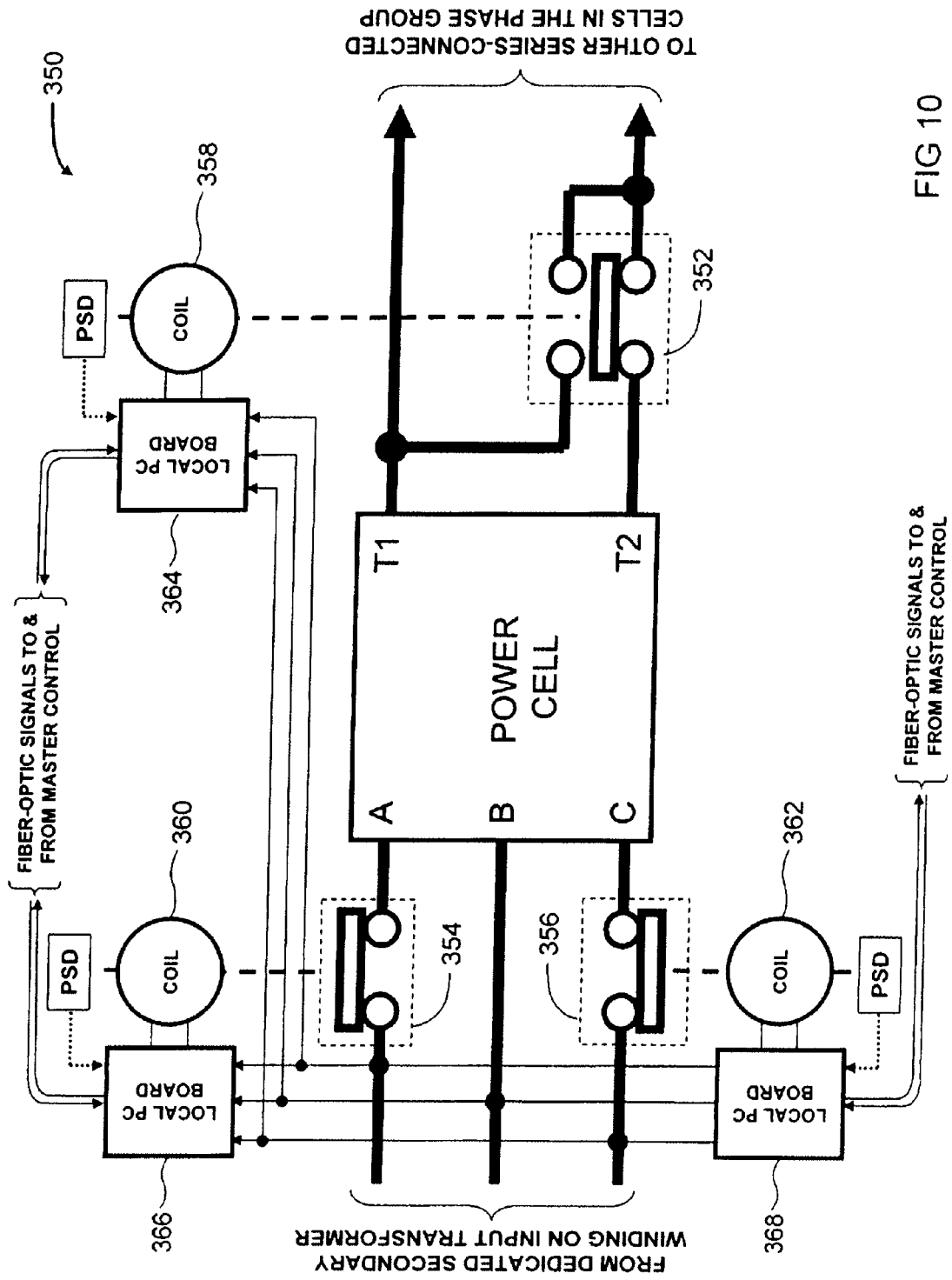
FIG. 10 illustrates various embodiments of a system for bypassing a power cell of a power supply.

FIG. 10 illustrates various embodiments of a system 350 for bypassing a power cell (e.g., power cell 210) of a power supply. The system 350 is similar to the system 250 of FIG. 5. The system 350 includes a first contact 352 connected to the output terminals T1 and T2 of the power cell, a second contact 354 connected to the input terminal A of the power cell, and a third contact 356 connected to the input terminal C of the power supply. Each of the contacts 352, 354, 356 include stationary portions and a movable portion. Although the second and third contacts 354, 356 are shown in FIG. 10 as being connected to input terminals A and C, it will be appreciated that, according to other embodiments, the second and third contacts 354, 356 may be connected to any two of the input terminals A, B and C.

The system 350 also includes a first coil 358 which controls the movable portions of the first contact 352, a second coil 360 which controls the movable portion of the second contact 354, and a third coil 362 which controls the movable portion of the third contact 356. According to various embodiments, the coils 358, 360, 362 are embodied as contactor coils. According to other embodiments, the coils 358, 360, 362 are embodied as magnetic latching coils which do not need to have continuous power applied to the coils in order to hold the plunger in its first or second position and/or to hold the moving portions of the contacts 352, 354, 356 in the non-bypass or bypass position. The first contact 352 and the first coil 358 may collectively comprise a first contactor, the second contact 354 and the second coil 360 may collectively comprise a second contactor, and the third contact 356 and the third coil 362 may collectively comprise a third contactor.

Figure 1:
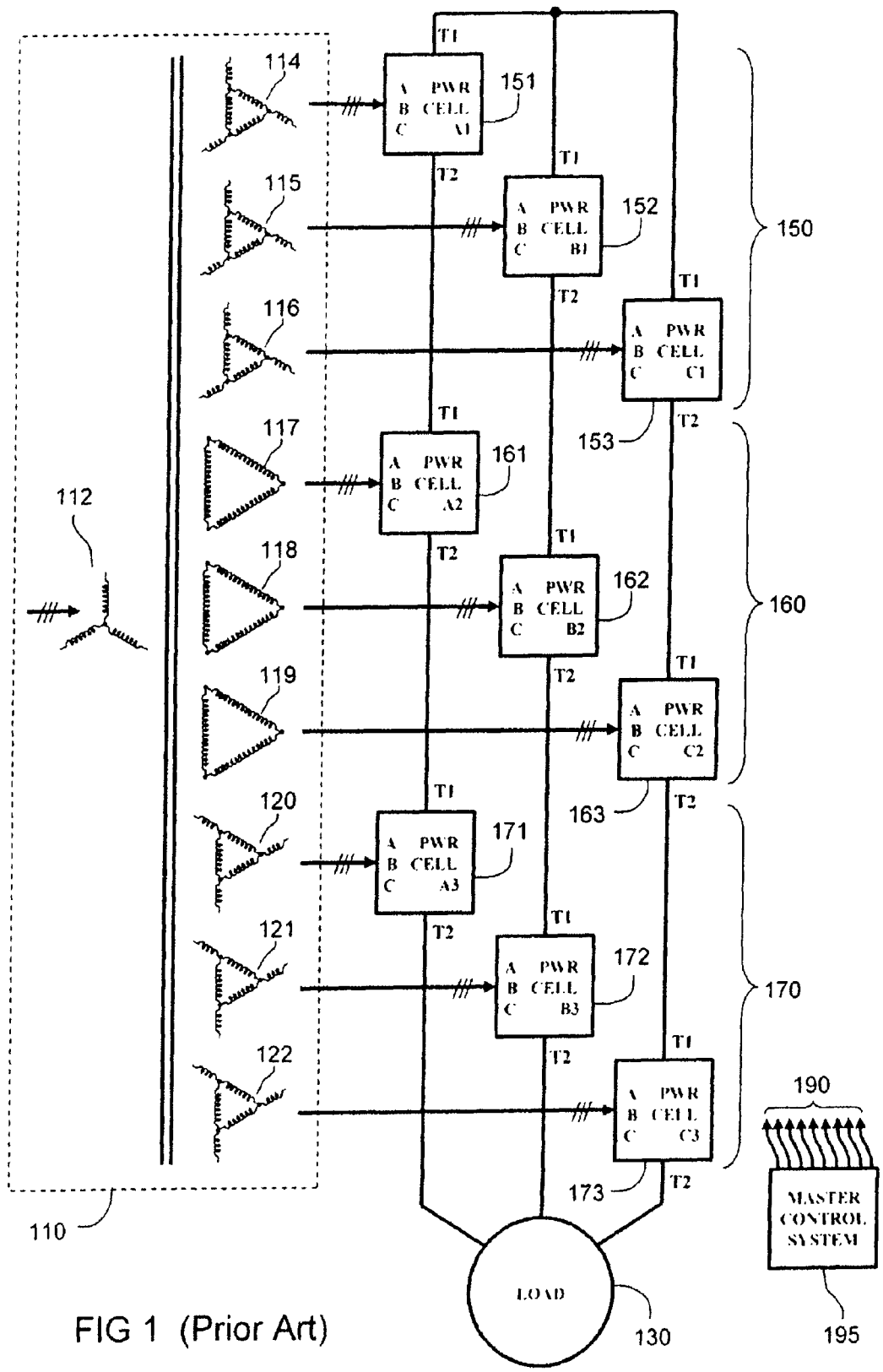
FIG. 1 illustrates various embodiments of a power supply.

The system 350 further includes a first local printed circuit board 364 in communication with the first coil 358, a second local printed circuit board 366 in communication with the second coil 360, and a third local printed circuit board 368 in communication with the third coil 362. Each of local printed circuit boards 364, 366, 368 are configured to control the respective movable portions of the contacts 352, 354, 356 via the respective coils 358, 360, 362. In general, each of the local printed circuit boards 364, 366, 368 are configured to receive commands from, and report status to, a master control device (e.g., master control system 195 of FIG. 1) that is held near ground potential. Each of the local printed circuit boards 364, 366, 368 are also configured to deliver pulses of energy to the respective coils 358, 360, 362 as needed to change the position of the movable portions of the respective contacts 352, 354, 356, and to recognize the position of the movable portions of the respective contacts 352, 354, 356. Each of the local printed circuit boards 364, 366, 368 may obtain control power from the input lines which are connected to input terminals A, B, C of the power cell. As shown in FIG. 10, one or more position sensing devices (labeled PSD in FIG. 10) may be utilized to provide the local printed circuit boards 364, 366, 368 with the respective positions of the movable portions of the contacts 352, 354, 356. According to various embodiments, the position sensing devices may be embodied as switching devices, hall effect sensors, optical sensors, etc.

For embodiments where the coils 358, 360, 362 are latching coils, the local printed circuit boards 364, 366, 368 may each include a DC capacitor which can store enough energy to switch the plunger and/or the movable portions of the respective contacts 352, 354, 356 between positions. Each of the local printed circuit boards 364, 366, 368 may also include a power supply which restores the stored energy after a switching event, using AC power from the input lines connected to the input terminals A, B, C of the power cell.

Figure 11:
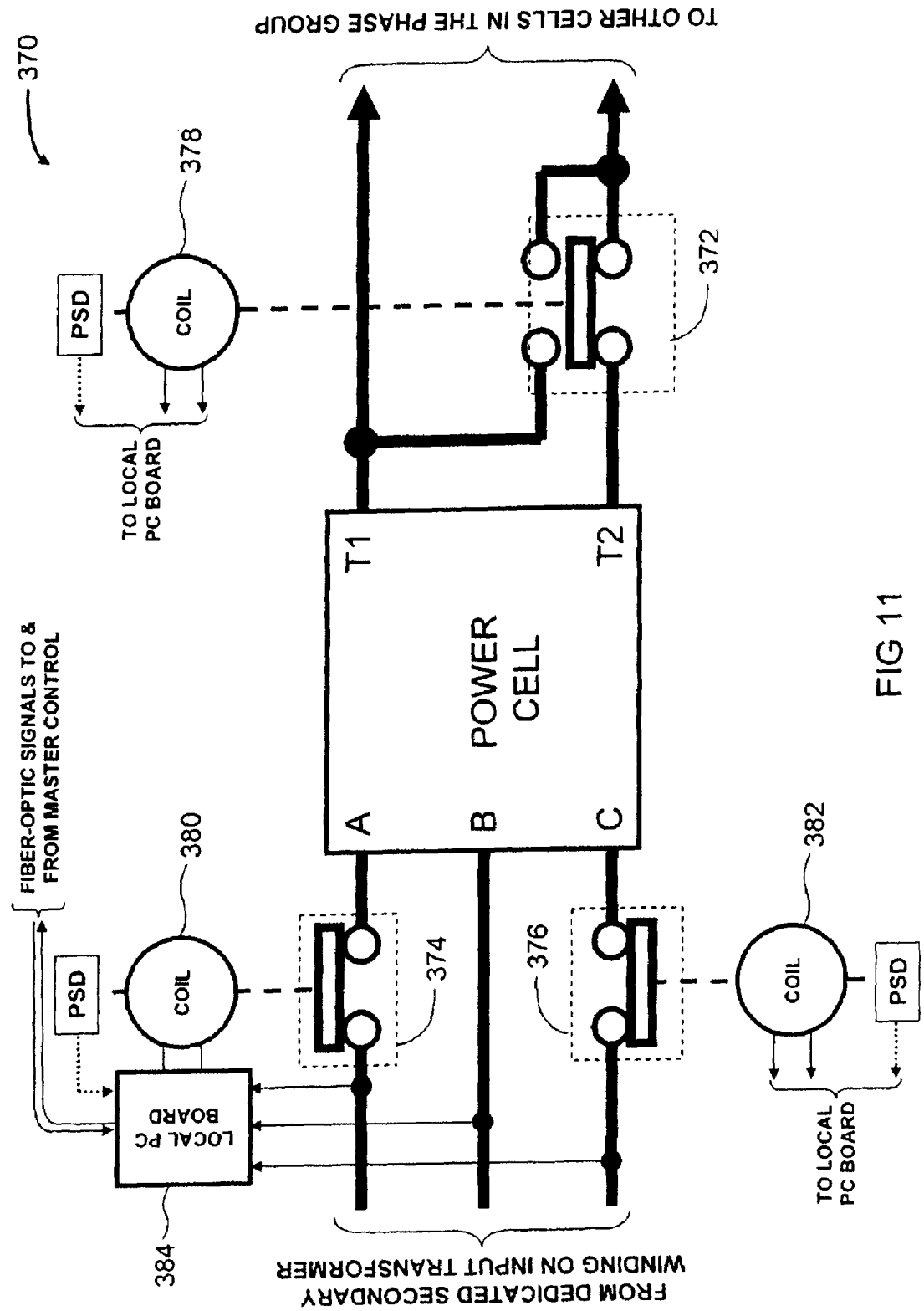
FIG. 11 illustrates various embodiments of a system for bypassing a power cell of a power supply.

FIG. 11 illustrates various embodiments of a system 370 for bypassing a power cell (e.g., power cell 210) of a power supply. The system 370 is similar to the system 350 of FIG. 10. The system 370 includes a first contact 372 connected to the output terminals T1 and T2 of the power cell, a second contact 374 connected to the input terminal A of the power cell, and a third contact 376 connected to the input terminal C of the power supply. Each of the contacts 372, 374, 376 include stationary portions and a movable portion. Although the second and third contacts 374, 376 are shown in FIG. 11 as being connected to input terminals A and C, it will be appreciated that, according to other embodiments, the second and third contacts 374, 376 may be connected to any two of the input terminals A, B and C.

The system 370 also includes a first coil 378 which controls the movable portions of the first contact 372, a second coil 380 which controls the movable portion of the second contact 374, and a third coil 382 which controls the movable portion of the third contact 376. According to various embodiments, the coils 378, 380, 372 are embodied as contactor coils. According to other embodiments, the coils 378, 380, 382 are embodied as magnetic latching coils which do not need to have continuous power applied to the coils in order to hold the plunger in its first or second position and/or to hold the moving portions of the contacts 372, 374, 376 in the non-bypass or bypass position.

According to various embodiments, the first contact 372 and the first coil 378 are portions of a first bypass device, the second contact 374 and the second coil 380 are portions of a second bypass device, and the third contact 376 and the third coil 382 are portions of a third bypass device. For such embodiments, the system 370 includes a plurality of bypass devices.

In contrast to the system 350 of FIG. 10, the system 370 includes a single local printed circuit board 384 which is in communication with the first coil 378, the second coil 380, and the third coil 382. The local printed circuit board 384 is configured to control the respective movable portions of the contacts 372, 374, 376 via the respective coils 378, 380, 382. Thus, the local printed circuit board 384 is similar to the local printed circuit boards described with respect to FIG. 10, but is different in that the local printed circuit board 384 is configured to drive three coils and recognize the respective positions of the movable portions of three contacts. In general, the local printed circuit board 384 is configured to receive commands from, and report status to, a master control device (e.g., master control system 195 of FIG. 1) that is held near ground potential.

The local printed circuit board 384 is also configured to deliver pulses of energy to the coils 378, 380, 382 as needed to change the position of the movable portions of the respective contacts 372, 374, 376, and to detect the position of the movable portions of the respective contacts 372, 374, 376. The local printed circuit board 384 may obtain control power from the input lines which are connected to input terminals A, B, C of the power cell. As shown in FIG. 11, one or more position sensing devices (labeled PSD in FIG. 11) may be utilized to provide the local printed circuit board 384 with the respective positions of the movable portions of the contacts 372, 374, 376. According to various embodiments, the position sensing devices may be embodied as switching devices, hall effect sensors, optical sensors, etc.

For embodiments where the coils 378, 380, 382 are latching coils, the local printed circuit board 384 may include a DC capacitor which can store enough energy to switch the plunger and/or the movable portions of the contacts 352, 354, 356 between positions. The local printed circuit board 384 may also include a power supply which restores the stored energy after a switching event, using AC power from the input lines connected to the input terminals A, B, C of the power cell.

Figure 12:
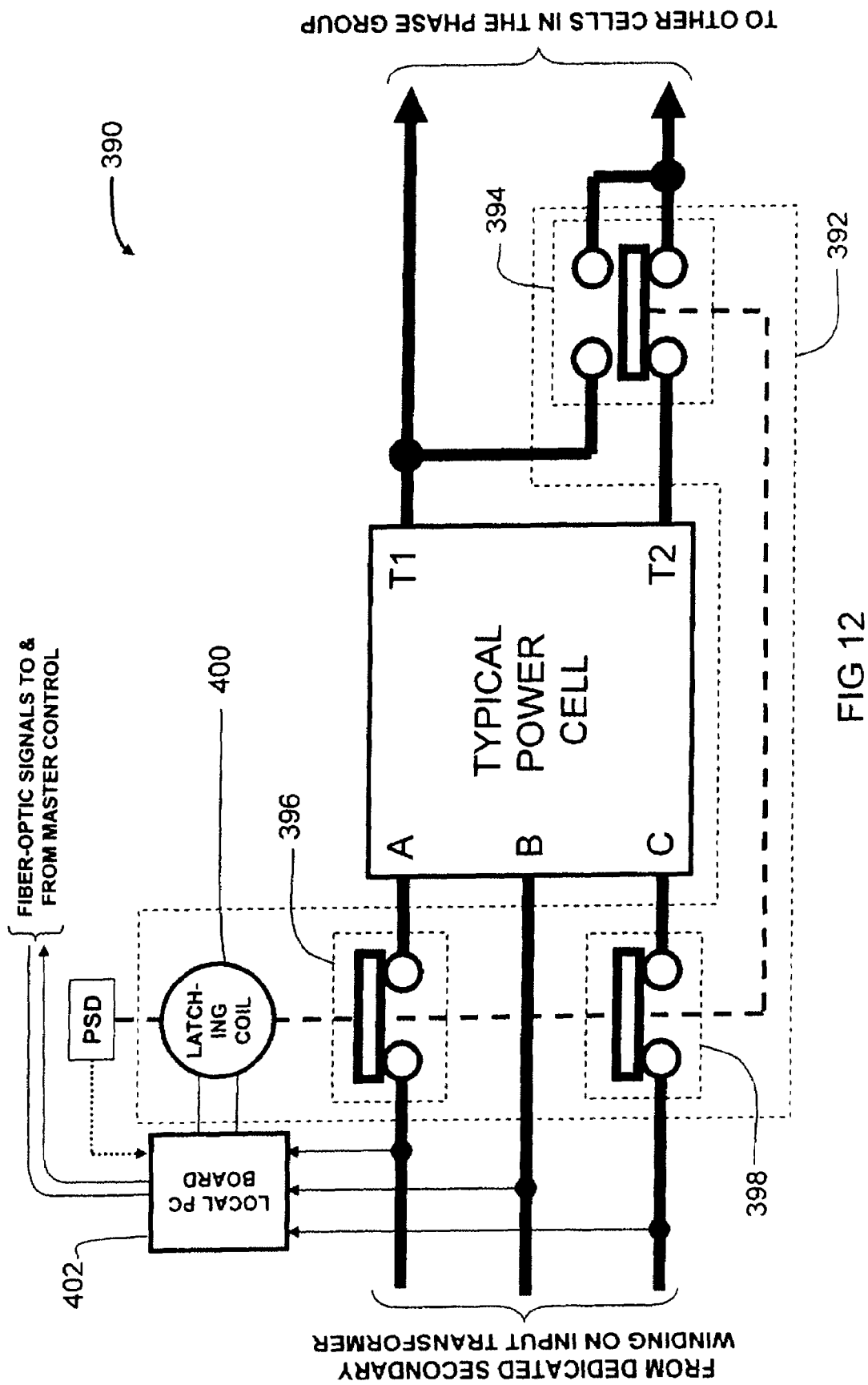
FIG. 12 illustrates various embodiments of a system for bypassing a power cell of a power supply.

FIG. 12 illustrates various embodiments of a system 390 for bypassing a power cell (e.g., power cell 210) of a power supply. The system 390 is similar to the system 370 of FIG. 11. The system 390 includes a bypass device 392 which may be embodied as a multi-pole contactor. The bypass device 392 may be identical to or similar to the bypass device 300 shown in FIGS. 7-9. The bypass device 392 includes a first contact 394 connected to the output terminals T1 and T2 of the power cell, a second contact 396 connected to the input terminal A of the power cell, and a third contact 398 connected to the input terminal C of the power supply. Each of the contacts 394, 396, 398 include stationary portions and a movable portion. Although the second and third contacts 396, 398 are shown in FIG. 12 as being connected to input terminals A and C, it will be appreciated that, according to other embodiments, the second and third contacts 396, 398 may be connected to any two of the input terminals A, B and C.

In contrast to system 370 of FIG. 11, the system 390 includes a single coil 400 which controls the movable portions of the first, second and third contacts 394, 396, 398. According to various embodiments, the coil 400 is embodied as a contactor coil. According to other embodiments, the coil 400 is embodied as a magnetic latching coil which does not need to have continuous power applied to the coil in order to hold the plunger in its first or second position and/or to hold the moving portions of the contacts 394, 396, 398 in the non-bypass or bypass position.

The system 390 also includes a single local printed circuit board 402 which is in communication with the coil 400. The local printed circuit board 402 is configured to control the respective movable portions of the contacts 394, 396, 398 via the coil 400. In general, the local printed circuit board 402 is configured to receive commands from, and report status to, a master control device (e.g., master control system 195 of FIG. 1) that is held near ground potential.

The local printed circuit board 402 is also configured to deliver pulses of energy to the coil 400 as needed to change the position of the movable portions of the respective contacts 394, 396, 398, and to recognize the position of the movable portions of the respective contacts 394, 396, 398. The local printed circuit board 402 may obtain control power from the input lines which are connected to input terminals A, B, C of the power cell. As shown in FIG. 12, a position sensing device (labeled PSD in FIG. 12) may be utilized to provide the local printed circuit board 402 with the respective positions of the movable portions of the contacts 394, 396, 398. According to various embodiments, the position sensing device may be embodied as a switching device, a hall effect sensor, an optical sensor, etc.

For embodiments where the coil 400 is a latching coil, the local printed circuit board 402 may also include a DC capacitor which can store enough energy to switch the plunger and/or the movable portions of the contacts 394, 396, 398 between positions. The local printed circuit board 402 may also include a power supply which restores the stored energy after a switching event, using AC power from the input lines connected to the input terminals A, B, C of the power cell.

Figure 13:
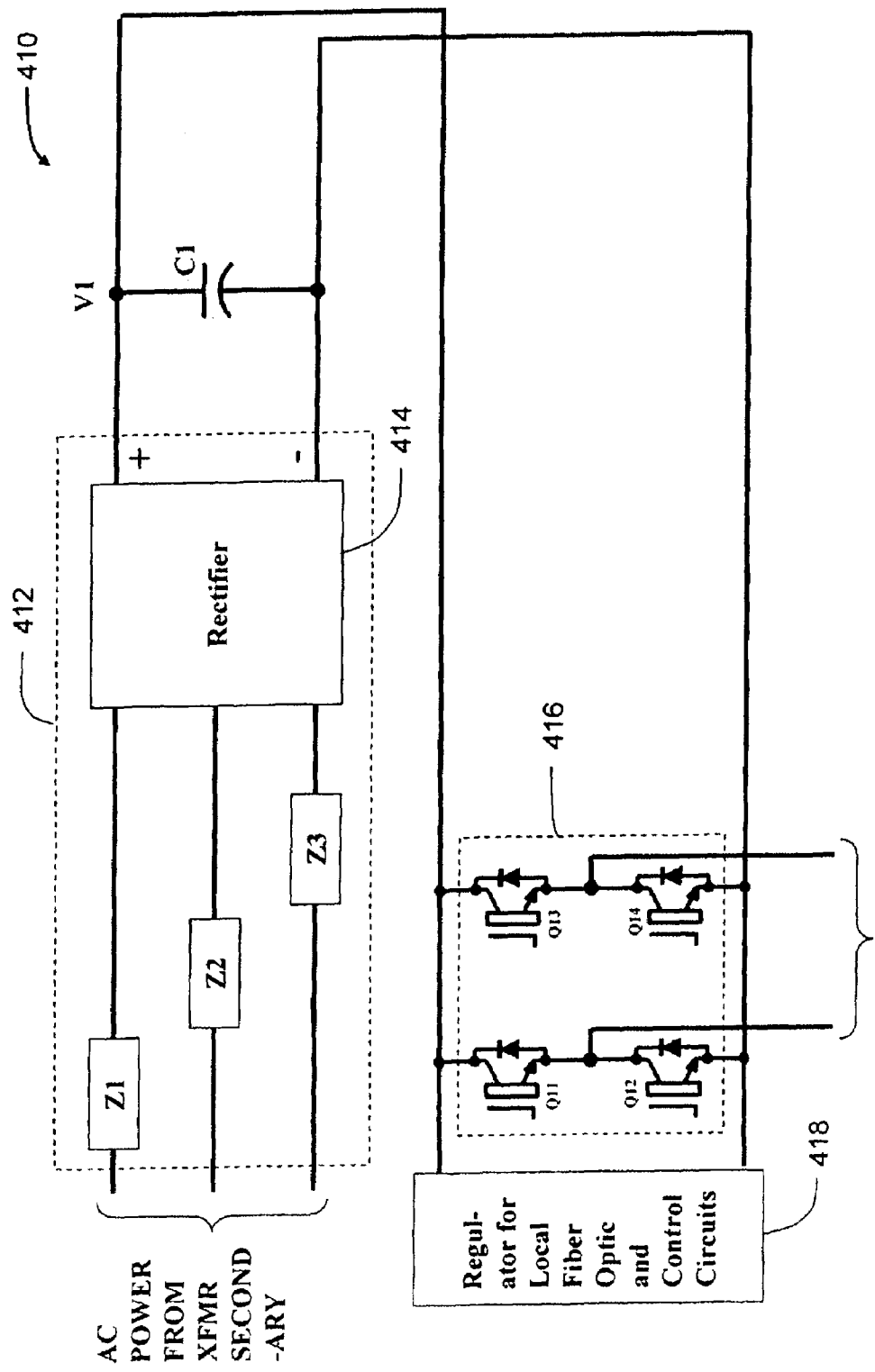
FIG. 13 illustrates various embodiments of a circuit for controlling a bypass device.

FIG. 13 illustrates various embodiments of a circuit 410 for controlling a bypass device (e.g., bypass device 392 of FIG. 12). The circuit 410 may be embodied as a printed circuit board having integrated circuits, discrete components, and combinations thereof. The circuit 410 may be utilized, for example, to provide the functionality of one or more of the local printed circuit boards described hereinabove. For reasons of simplicity, the circuit 410 will be described as a printed circuit board in the context of its use in the system 390 of FIG. 12.

The circuit board 410 includes an on-board DC control power supply 412. The power supply 412 includes series limiting impedance components Z1, Z2, Z3 and a rectifier 414. The impedance components Z1, Z2, Z3 are respectively connected to three input lines which are connected to input terminals A, B, C of a power cell (e.g., power cell 210). The impedance components Z1, Z2, Z3 may be embodied, for example, to include capacitors, and may be sized such that if one fails, the other two can continue to operate to limit the available current. According to various implementations, the impedance components Z1, Z2, Z3 may also be embodied to include resistors in series with the capacitors. According to various embodiments, the rectifier 414 is a six-pulse diode rectifier. The printed circuit board 410 also includes a capacitor C1 connected to the power supply 412, a group of switching devices 416 connected to the capacitor C1, and another regulator 418 connected to the capacitor C1. As shown in FIG. 13, the group of switching devices 416 is also connected to a coil (e.g., coil 400 of the bypass device 392 of FIG. 12).

The capacitor C1 is sized to be able to store the amount of energy needed to cause the plunger and/or the movable portions of the contacts to change positions when such energy is applied to the coil. Capacitor C1 may be embodied as, for example, an electrolytic capacitor, an ultra capacitor, a film type capacitor, etc. Although the capacitor C1 is shown as a single capacitor in FIG. 13, it will be appreciated that capacitor C1 may be embodied as multiple capacitors (e.g., three capacitors) connected in series or parallel.

The group of switching devices 416 is configured to apply either a positive or a negative current pulse to the coil. The individual switching devices may be embodied as, for example, mosfets, insulated gate bipolar transistors, etc. Although each coil described herein is described in the context of a single winding for purposes of simplicity, one skilled in the art will appreciate that according to other embodiments, a given coil can comprise two redundant windings, with one winding being connected to receive the positive current pulse and the other winding connected to receive the negative current pulse. Thus, although the group of switching devices 416 is shown in FIG. 13 as having four individual switching devices, according to other embodiments, the group of switching devices 416 may include a different number of switching devices (e.g., two switching devices). The regulator 418 may be configured to condition the voltage of the power supply 412 to operate fiber optic and control circuits.

In operation, the power supply 412 receives AC power from the input lines connected to the input terminals A, B, C of the power cell. The AC power flows through the series limiting impedance components Z1, Z2, Z3 to the rectifier 414. The rectifier 414 converts the AC power to DC power, and the DC power charges capacitor C1 to the voltage at V1. The voltage at V1 is applied to the group of switching, devices 416, and depending on the respective states (e.g., on, off) of the individual switching devices, the group of switching devices 416 may deliver a positive or a negative current pulse to the coil. The positive or negative current pulses create a magnetic field which is utilized to change the position of the plunger and/or the movable portions of the contacts which are connected to the input and output terminals of the power cell.

When the capacitor C1 is discharging, the group of switching devices 416 may employ pulse-width modulation (PWM) to maintain a substantially constant average voltage (or constant current) on the coil. In general, when the capacitor C1 is discharging, the voltage across the capacitor C1 is equal to or greater than approximately one-half of its worst case initial voltage. When the coil is a latching coil and none of the switching devices are in the "on" state, the plunger and/or the movable portions of the contacts may maintain their existing positions by magnetic latching. During the time that the plunger and/or the movable portions of the contacts maintain their existing positions by magnetic latching, the power supply 412 can recharge the capacitor C1.

In general, the capacitor C1, the group of switching devices 416, the coil connected to the group of switching devices 416, and the regulator 418 should each be rated for the maximum voltage expected to be delivered to the power cell (i.e., the peak of the input AC line-to-line voltage delivered to the power cell). Additionally, as the voltage at V1 can vary from the maximum voltage delivered to the power cell down to approximately one-half of the lowest voltage delivered to the power cell (i.e., when capacitor C1 is discharging), the coil should also be designed to control the position of the plunger and/or the movable portions of the contacts even when approximately one-half of the lowest voltage delivered to the power cell is applied to the coil.

With no DC load, the rectifier 414 may generate a DC output voltage at V1 which is substantially equal to the peak of the input line-to-line AC voltage feeding the power cell. In some embodiments, a power supply may function with power cells having a range of nominal voltage ratings from about 630 VAC to about 750 VAC. The power supply may also need to tolerate a range of utility voltage from 110% to 70% of nominal. Thus, the peak of the input AC line-to-line voltage (and hence the no-load DC voltage at V1) may be as high as 1167 volts, and as low as 686 volts. According to other embodiments, other values are possible.

Figure 14:
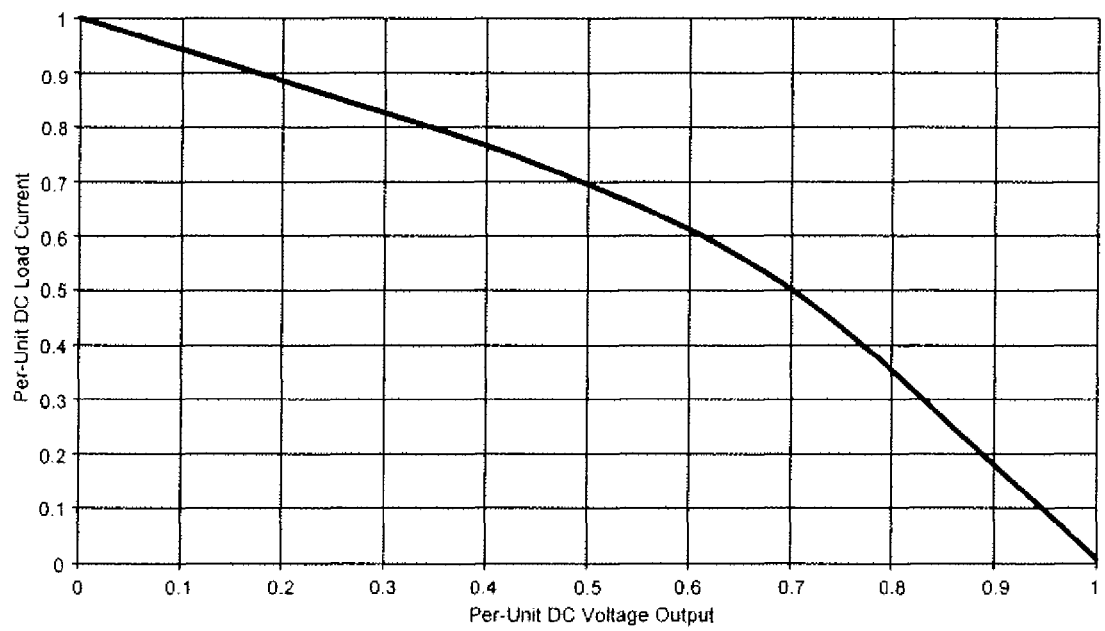
FIGS. 14 and 15 show the per-unit DC current and power available for various per-unit DC voltages at V1 of the circuit of FIG. 13.
Figure 15:
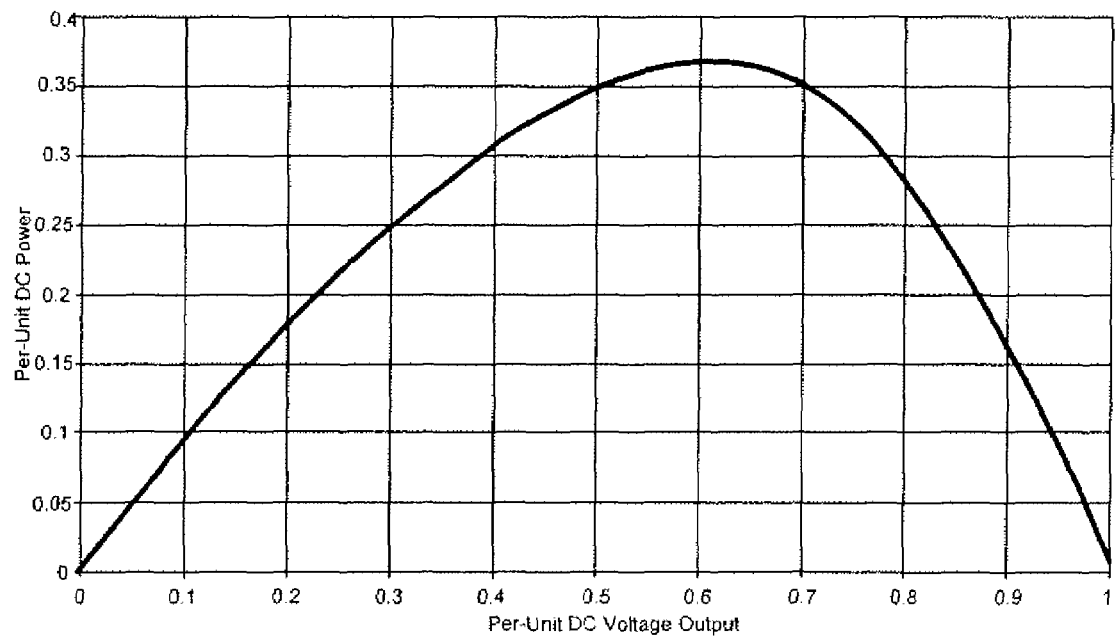

With a short (i.e., line-to-neutral) on the DC output, the DC output current is effectively limited to approximately 0.55 times the peak of the input AC line-to-line voltage, divided by the impedance of the impedance components Z1, Z2, Z3. For example, if the impedance components Z1, Z2, Z3 are embodied as 0.1 μfd capacitors and the peak AC voltage is 1167 volts at 60 Hertz, the maximum available DC current would be approximately 0.024 amperes. FIGS. 14 and 15 show the per-unit DC current and power available, for various per-unit DC voltages at V1. The per-unit values are based on open-circuit and short-circuit values defined above.

Figure 16:
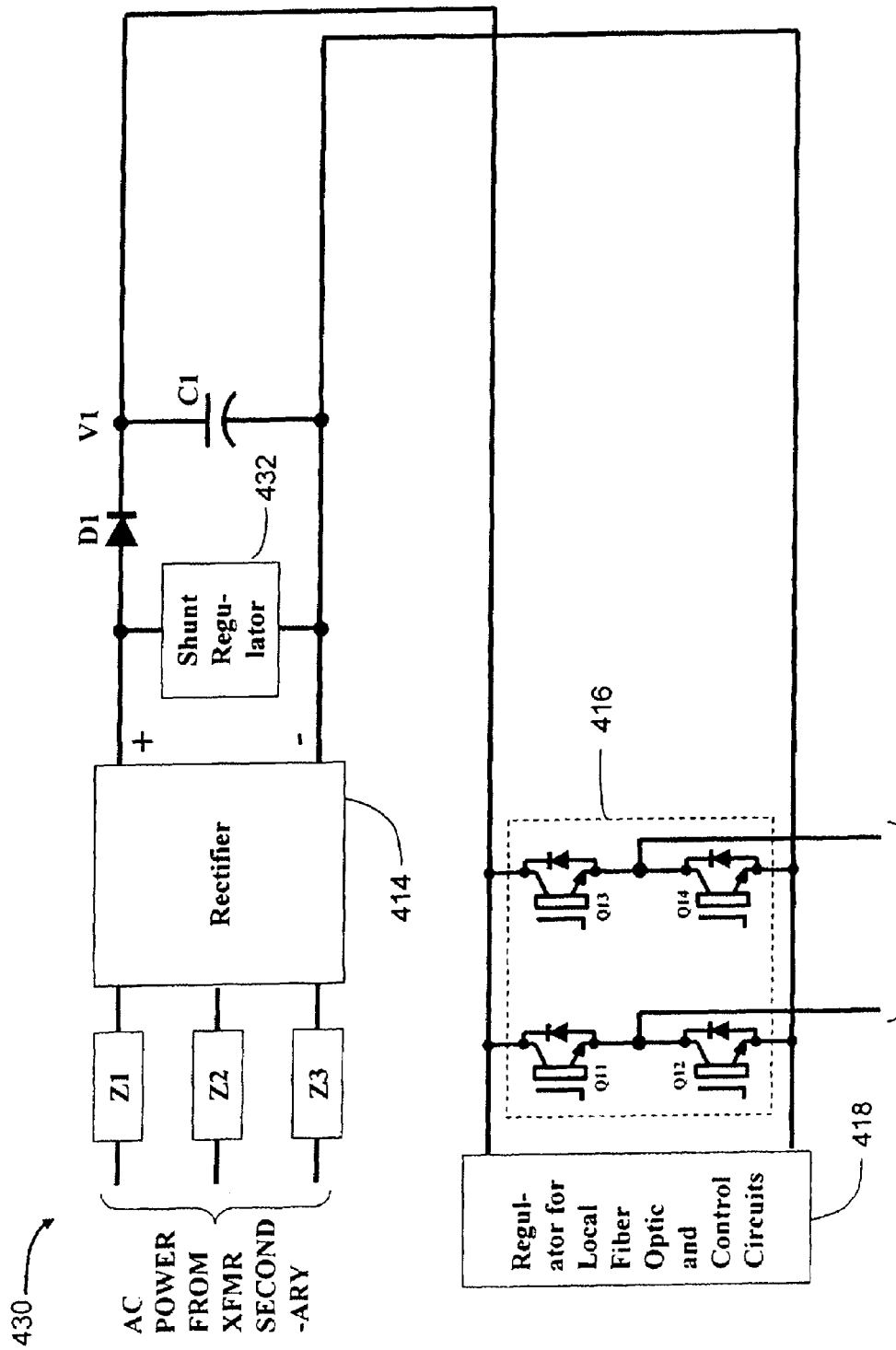
FIG. 16 illustrates various embodiments of a circuit for controlling a bypass device.

FIG. 16 illustrates various embodiments of a circuit 430 for controlling a bypass device (e.g., bypass device 392 of FIG. 12). The circuit 430 is similar to the circuit 410 of FIG. 13, and further includes a shunt regulator 432 connected to the rectifier 414 and a diode D1 connected to the shunt regulator 432. The shunt regulator 432 operates to limit the voltage on capacitor C1 to a particular voltage (e.g., 400 volts). For example, whenever the voltage at V1 exceeds a particular voltage (e.g., 400 volts), the shunt regulator 432 may short out the rectifier 414. The diode D1 prevents capacitor C1 from discharging into the shunt regulator 432.

In general, for such embodiments, the capacitor C1, the group of switching devices 416, the coil connected to the group of switching devices 416 (e.g., coil 400 of the bypass device 392 of FIG. 12), and the regulator 418 could each be rated for the particular voltage (e.g., 400 volts) which is less than the maximum voltage expected to be delivered to the power cell (i.e., the peak of the input AC line-to-line voltage delivered to the power cell). If the minimum no-load voltage available from the diode D1 is, for example, 686 volts, the voltage at V1 would always reach 400 volts for a nominal cell voltage rating as low as 630 VAC, even with utility variations from 110% to 70% of nominal. If the maximum short-circuit current available from the rectifier 414 is limited to, for example, 0.024 amperes (see FIGS. 14 and 15), no harm occurs when the rectifier 414 is shorted out by the shunt regulator 432. For such embodiments, as the voltage at V1 can vary from the maximum voltage (e.g., 400 volts) down to approximately one-half of the maximum voltage (e.g., 200 volts), the coil should also be designed to control the position of the plunger and/or the movable portions of the contacts even when the lowest voltage at V1 is applied to the coil.

Figure 17:
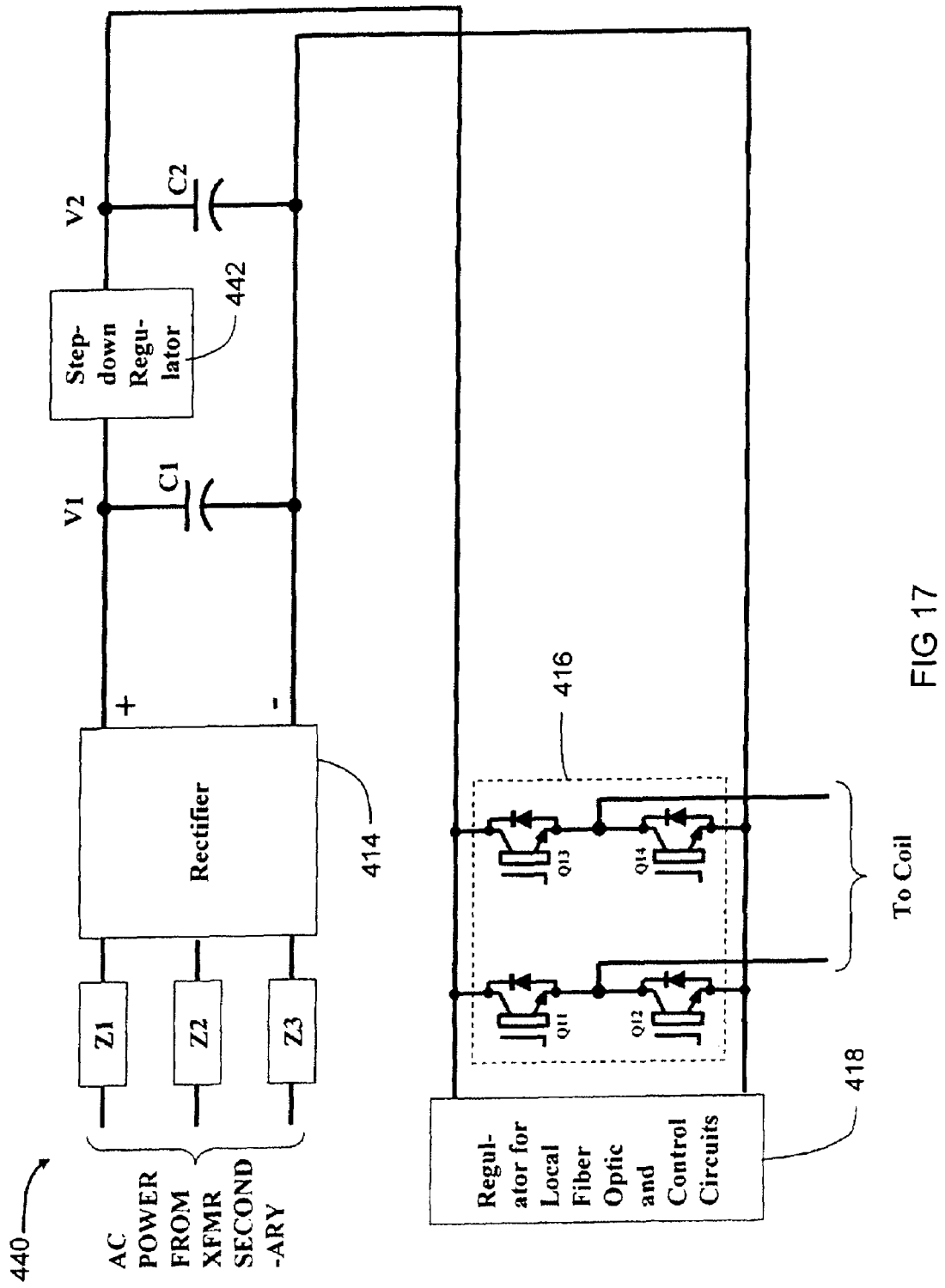
FIG. 17 illustrates various embodiments of a circuit for controlling a bypass device.

FIG. 17 illustrates various embodiments of a circuit 440 for controlling a bypass device (e.g., bypass device 392 of FIG. 12). The circuit 440 is similar to the circuit 410 of FIG. 13, and further includes a step-down regulator 442 connected to the capacitor C1, and a capacitor C2 connected to the step-down regulator 442. The step-down regulator 442 operates to step-down the variable voltage at V1 to a lower fixed voltage at V2. As the voltage applied to the group of switches 416, the coil connected to the group of switches 416 (e.g., coil 400 of the bypass device 392 of FIG. 12), and the regulator 418 is the lower voltage at V2, the group of switching devices 416, the coil, and the regulator 418 may each be rated for the lower voltage. According to various embodiments, the voltage at V2 may be low enough to allow for the use of integrated circuits for the group of switches 416 and the regulator 418. Even if the voltage at V1 sags significantly while the capacitor C1 discharges its stored energy, the voltage at V2 could be held nearly constant, provided that the voltage provided by the step-down regulator 442 is less than the minimum voltage that appeared at V1 during the sag. For such embodiments, pulse width modulation control of the switching devices of the H-bridge 416 is not necessary.

Figure 18:
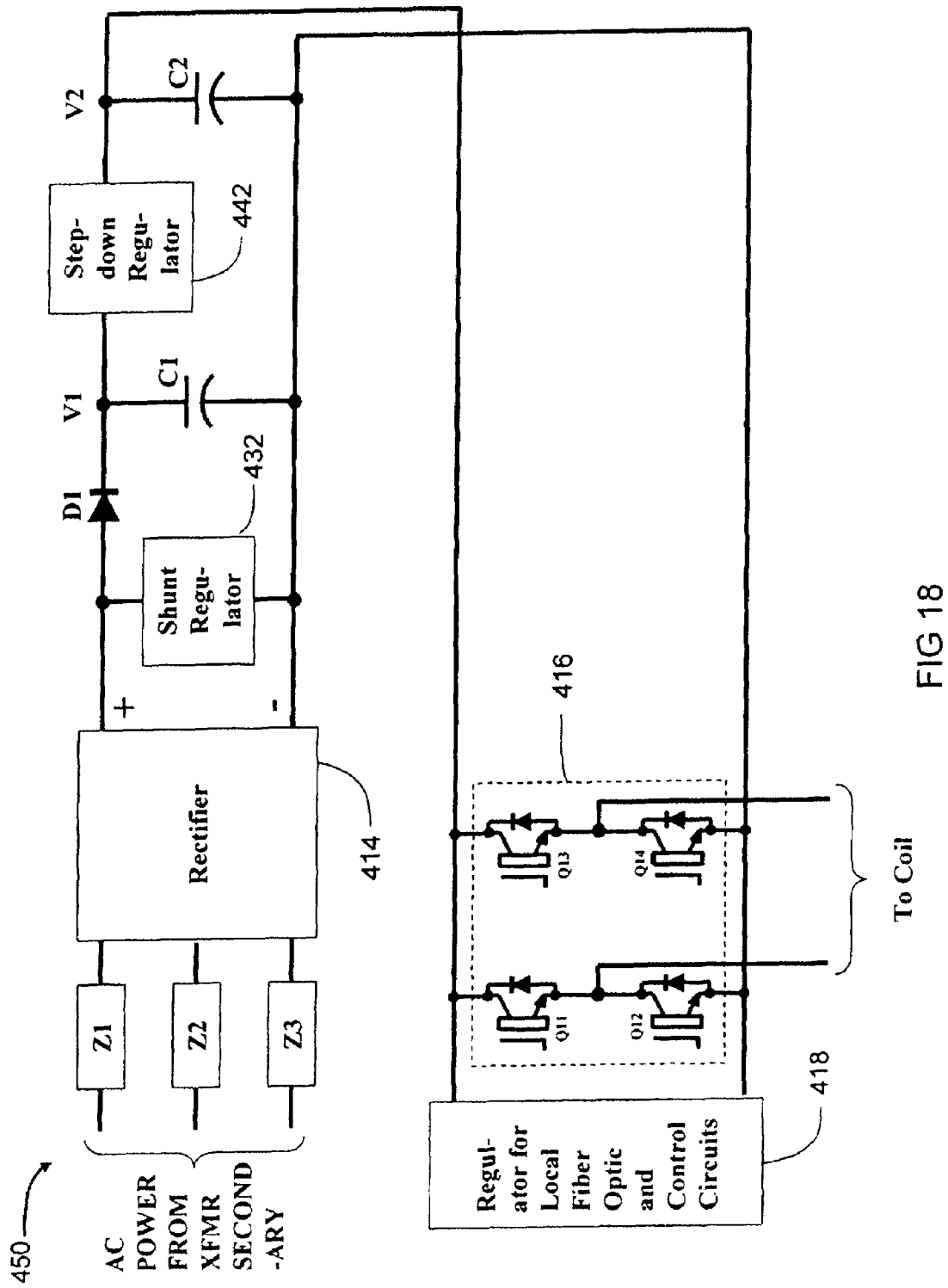
FIG. 18 illustrates various embodiments of a circuit for controlling a bypass device.

FIG. 18 illustrates various embodiments of a circuit 450 for controlling a bypass device (e.g., bypass device 392 of FIG. 12). The circuit 450 is similar to the circuit 410 of FIG. 13, and further includes a shunt regulator 432 connected to the rectifier 414, a diode D1 connected to the shunt regulator 432, a step-down regulator 442 connected to the capacitor C1, and a capacitor C2 connected to the step-down regulator 442. The added components operate as described in FIGS. 16 and 17, and such operation can result in the voltage at V1 being, for example, between 200 volts DC and 400 volts DC. For such embodiments, the lower DC voltages at V1 would reduce the peak voltage stress on the shunt regulator 432, the capacitor C1, and the step-down regulator 442. For example, the peak voltage stress on the shunt regulator 432, the capacitor C1, and the step-down regulator 442 may be reduced from 1167 volts DC to 400 volts DC. The voltage at V2 could be held nearly constant, at a low value. For such embodiments, pulse width modulation control of the group of switching devices 416 is not necessary, and integrated circuits can be utilized for the group of switches 416 and the regulator 418. Also, the amount of insulation needed for the coil connected to the group of switching devices 416 (e.g., coil 400 of the bypass device 392 of FIG. 12) could be reduced.

Figure 19:
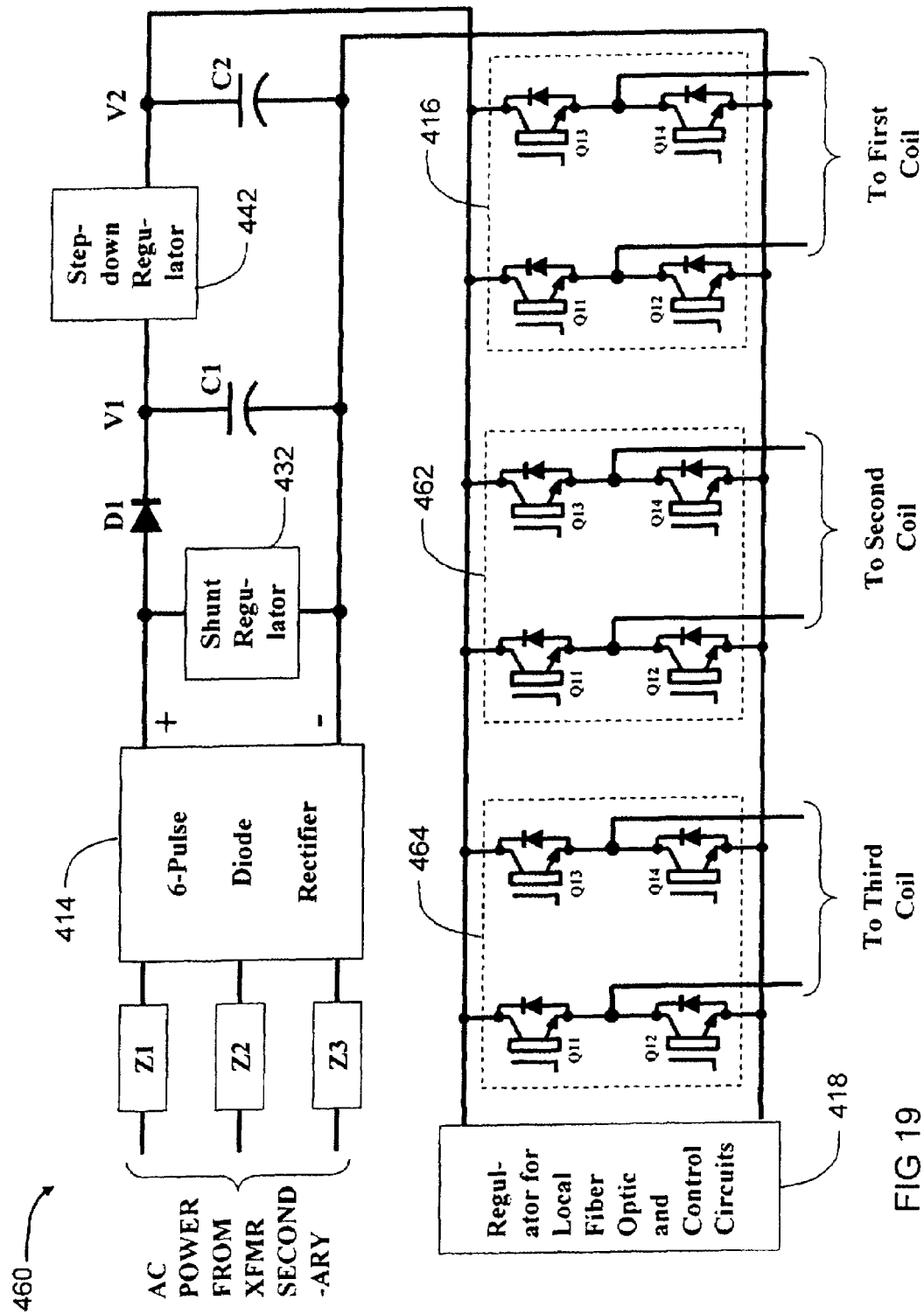
FIG. 19 illustrates various embodiments of a circuit for controlling a plurality of bypass devices.

FIG. 19 illustrates various embodiments of a circuit 460 for controlling a plurality of bypass devices (e.g., the bypass devices of FIG. 11). The circuit 460 is similar to the circuit 450 of FIG. 18, but includes three groups of switching devices 416, 462, 464 which are each connected to the capacitor C2. The additional groups of switching devices 462, 464 are similar to the group of switching devices 416 as described hereinabove. Each of the groups of switching devices 416, 462, 464 are also connected to a different coil (e.g., coils 378, 380, 382 of FIG. 11) which forms a portion of a different bypass device. Thus, one skilled in the art will appreciate that the circuit 460 may be utilized, for example, to provide the functionality of the local printed circuit board 384 of FIG. 11, which controls the three coils 378, 380, 382 which control the respective positions of the plunger and/or the movable portions of contacts 372, 374, 376. For such embodiments, the capacitor C1 is sized to be able to store the amount of energy needed to cause the plunger and/or the movable portions of all the contacts to concurrently change positions when such energy is applied to all the coils.

While several embodiments of the invention have been described herein by way of example, those skilled in the art will appreciate that various modifications, alterations, and adaptions to the described embodiments may be realized without departing from the spirit and scope of the invention defined by the appended claims.

What is claimed is:

1. A system, comprising:
   a multi-winding device having a primary winding and a plurality of three-phase secondary windings;
   a plurality of power cells, wherein each power cell is connected to a different three-phase secondary winding of the multi-winding device;
   a stationary portion of a first contactor connected to a first input terminal of at least one of the power cells;
   a stationary portion of a second contactor connected to a second input terminal of the at least one of the power cells; and
   a stationary portion of a third contactor connected to first and second output terminals of the at least one of the power cells.

2. The system of claim 1, further comprising:
   a first coil coupled to a movable portion of the first contactor;
   a second coil coupled to a movable portion of the second contactor; and
   a third coil coupled to a movable portion of the third contactor.

3. The system of claim 2, wherein at least one of the first, second and third coils is a latching coil.

4. The system of claim 2, further comprising a control circuit connected to at least one of the first, second and third coils.

5. The system of claim 4, wherein the control circuit is connected to the three-phase secondary winding to which the at least one of the power cells is connected.

6. The system of claim 4, wherein the control circuit comprises a printed circuit board.

7. The system of claim 4, wherein the control circuit comprises:
- an impedance component connected to the three-phase secondary winding to which the at least one of the power cells is connected;
- a rectifier connected to the impedance component;
- a capacitor connected to the rectifier; and
- a group of switching devices connected to the capacitor and at least one of the first, second and third coils.

8. The system of claim 7, wherein the rectifier is a six-pulse rectifier.

9. The system of claim 7, wherein the group of switching devices is an integrated circuit.

10. The system of claim 7, further comprising a second regulator connected to the capacitor.

11. The system of claim 10, wherein the second regulator is an integrated circuit.

12. The system of claim 7, further comprising:
- a shunt regulator connected to the rectifier; and
- a diode connected between the shunt regulator and the capacitor.

13. The system of claim 7, further comprising:
- a step-down regulator connected to the capacitor; and
- a second capacitor connected between the step-down regulator and the group of switching devices.

14. The system of claim 7, further comprising:
- a shunt regulator connected to the rectifier;
- a diode connected between the shunt regulator and the capacitor;
- a step-down regulator connected to the capacitor; and
- a second capacitor connected between the step-down regulator and the group of switching devices.

15. The system of claim 4, further comprising a switching device connected to the control circuit and at least one of the coils.

16. A system, comprising:
- a multi-winding device having a primary winding and a plurality of three-phase secondary windings;
- a plurality of power cells, wherein each power cell is connected to a different three-phase secondary winding of the multi-winding device;
- a first contactor connected to a first input terminal of at least one of the power cells;
- a second contactor connected to a second input terminal of the at least one of the power cells; and
- a third contactor connected to first and second output terminals of the at least one of the power cells.

17. The system of claim 16, wherein:
the first contactor comprises a first coil;
the second contactor comprises a second coil; and
the third contactor comprises a third coil.

18. The system of claim 16, further comprising a control circuit connected to at least one of the first, second and third contactors.

19. The system of claim 18, wherein the control circuit comprises a printed circuit board.

20. The system of claim 18, wherein the control circuit comprises:
- an impedance component connected to the three-phase secondary winding to which the at least one of the power cells is connected;
- a rectifier connected to the impedance component;
- a capacitor connected to the rectifier; and
- a group of switching devices connected to the capacitor and at least one of the first, second and third coils.

* * * * *